United States Patent [19]

Kazar

[11] Patent Number: 5,008,595

[45] Date of Patent: Apr. 16, 1991

[54] ORNAMENTAL LIGHT DISPLAY APPARATUS

[75] Inventor: Dennis M. Kazar, Austin, Tex.

[73] Assignees: Laser Link, Inc., Austin, Tex.; William K. Wells, Jr., Reston, Va.

[21] Appl. No.: 315,450

[22] Filed: Feb. 23, 1989

Related U.S. Application Data

[63] Continuation of Ser. No. 871,035, Sep. 8, 1986, Pat. No. 4,870,325, Continuation of Ser. No. 810,304, Dec. 18, 1985.

[51] Int. Cl.[5] .............................................. H04B 37/02

[52] U.S. Cl. .................................... 315/178; 315/183; 315/210; 315/250; 315/324

[58] Field of Search ............... 315/178, 182, 183, 210, 315/250, 312, 323, 324; 362/231, 800, 803, 806; 340/700, 701, 702, 800

[56] References Cited

U.S. PATENT DOCUMENTS 3,875,456 4/1975 Kano et al. ........................ 313/501
3,911,423 10/1975 Arndt et al. ........................ 315/153
4,329,625 5/1982 Nishizawa et al. ................. 315/158
4,420,711 12/1983 Takahashi et al. .................. 315/324
4,445,132 4/1984 Ichikawa et al. ................... 313/500
4,484,105 11/1984 Kriete et al. ........................ 315/133
4,647,927 3/1987 Ichikawa et al. ................... 340/792
4,686,425 8/1987 Havel ................................. 315/154

*Primary Examiner*—Robert J. Pascal
*Attorney, Agent, or Firm*—Kenyon & Kenyon

[57] ABSTRACT

Ornamental and decorative light display utilizing LEDs constructed of two or more individual diodes. Each diode or portion of a diode is alternately selected and energized at a sufficient frequency that colors can blend to produce another color. The system provides for an extremely large configuration of LEDs to be driven at a low average power and at the same time to allow the user to select individual lights to be constantly illuminated or flash in response on oscillating voltage source or allow multicolored patterns to be generated using bicolor LEDs.

32 Claims, 12 Drawing Sheets

FIG. 3
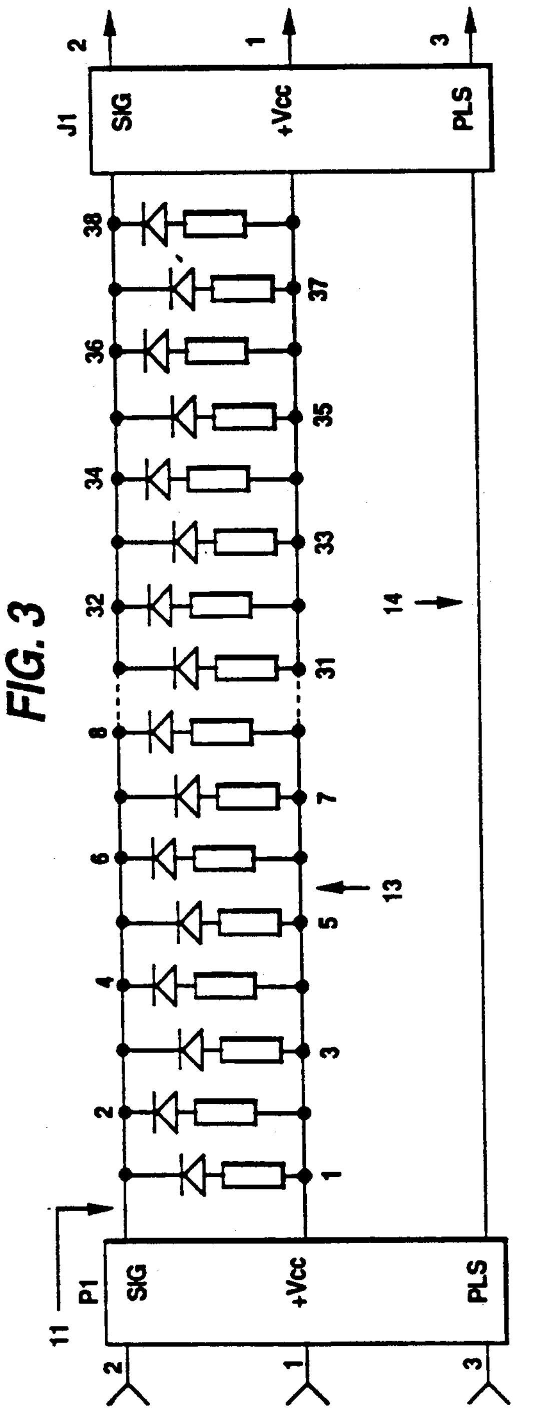
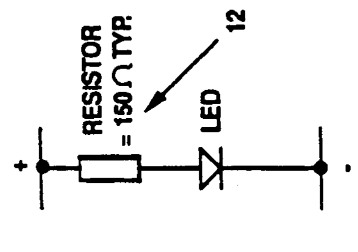
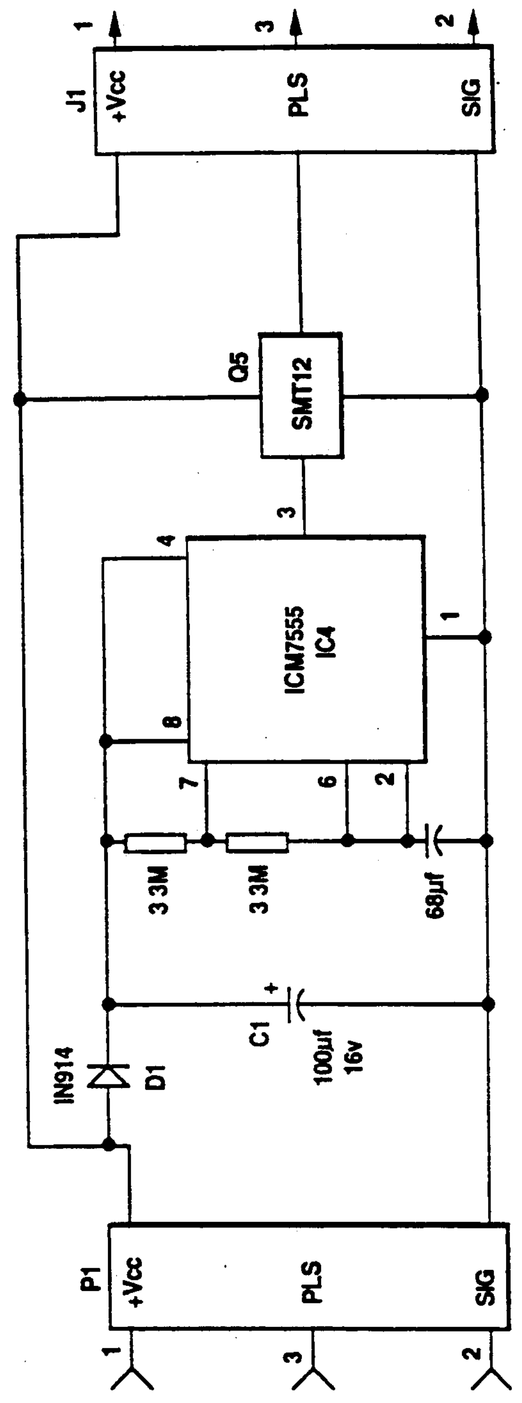
FIG. 4

ORNAMENTAL LIGHT DISPLAY APPARATUS

This is a continuation of application Ser. No. 871,035 filed 9/8/86,now U.S. Pat. No. 4,870,325, which is a continuation of application Ser. No. 810,304, filed 12/18/85.

BACKGROUND AND DISCUSSION OF THE INVENTION

Ornamental and decorative light displays utilizing incandescent lamps with plugs and sockets interconnected by flexible wires has long been a commonly accepted technique for carrying power to the lamps and allowing flexibility in forming the display. This same arrangement is also used to supply power using Light Emitting Diodes (LEDs). The nature of the LED allows both static and dynamic operation, single and multicolor. That is, the device can be operated by both constant battery voltage or an oscillating voltage. This oscillating voltage can be a two level signal, of varying amplitude, or pulse width modulated.

Bedmars/Electro-Harmonix in U.S. Pat. No. 4,264,845 uses a plurality of generating means for producing a plurality of sets of binary signals of different periods. The configuration of the LED arrays described in this patent are also in common use such as LED bar graph displays in both matrix and linear configuration. This patent also makes no allowance for low power or minimization of numbers power conductors.

Holiday and other ornamental lamp systems have typically utilized the socket and bulb approach where an incandescent lamp is threadedly engaged with a complementary threaded socket. These systems use an extraordinary amount of power for the light generated, particularly given the purpose, have a relatively short life span of about one thousand to ten thousand hours of use, require substantial surge current when placed in operation and are generally not reliable. In addition they are rather difficult to store. Since the incandescent lamps are typically made of thin glass bulbs, they are exceptionally fragile and often will break when stored or sometimes when in use. In addition to the deficiencies discussed above, there are certain safety factors which detract from use of incandescent lamps such as the heat that they generate and the potential for shorts causing shocks and fire hazards if the shorts and the heat are generated in or around particularly dry or otherwise flammable material.

LEDs have been used in certain instances in an ornamental manner but have found rather limited use due to their design and configuration. LEDs have been mounted on a tape to permit certain configurations of numbers which can be adhered to a relatively flat surface. As ornamental lights used in the holiday season are particularly price sensitive, the manner of fabrication, the configuration of the elements and their ability to withstand wear are factors normally weighed by consumers and producers in arriving at an economically marketable item.

The invention described herein overcomes many of the problems discussed above. An advantage of the lighting system of the invention revolves around its simplicity of manufacture, a configuration which is highly durable and lends itself to permanence in addition to a long life and low power requirements. Applicant's invention utilizes LED lamps which operate from a low voltage direct current power such as batteries or typical alternating source with a transformer rectifier for converting the household alternating current to direct current for use with the lights. Both systems utilize the same light strings each having thirty to fifty-two individual lamps. The lifetime of the individual lamp is typically one hundred thousand hours. If used continuously the lights can be expected to burn for over ten years. The power unit is fused and provided with 115/230 volts selection compatible with domestic and international markets. The light strings are designed to further overcome the necessity of plugging each string into the power source. Rather the system provides the user with the ability to plug one set of lights into the power unit and the second set of lights into the first, the third and second etc.

Much of the problem with incandescent lights is the deterioration of the sockets from one season to the next. The sockets are inexpensively made and corrode causing poor or intermittent connections. The wires in these lights are wrapped around the contacts and there is no positive joint as would be found if the connections were soldered. Connections between the lamp terminals and the metal contact is a pressure only.

The invention described herein uses an insulation piercing connection with the lamp and socket being a single molded assembly. The wire is conductive stranded similar to stereo speaker wire where a number of conductors are housed in the same insulation package or can be separately insulated. LED lamps are highly shock resistant and provide significant advantages over incandescent bulbs which can shatter when shocked or vibrated in the on condition. These LED lamps do not radiate heat; and the non-photon (or heat) energy is dissipated through the lamp leads. Incandescent lamps on the other hand radiate considerable heat through the lens. In addition, no surge current in a LED system is experienced contrary to the incandescent lamp situation when cold. Because of their configuration, shock resistance and other features, the LED lamp system can be mounted permanently without having to replace individual lamps. Incandescents are generally mounted in sockets which can be as expensive as the lamp itself. Not only does socket deterioration add to the unreliability of operation, but also incandescent lamps often must be replaced over the lifetime of the system.

A further embodiment of the invention allows for the use of light emitting diodes constructed of two or more individual diodes. These devices are fabricated in two configurations and are generally intended to be used as multiple state indicators. For example, a Bicolor Red/-Green diode can indicate "Stop" or "Go" depending on which color is selected. However, if each color is alternately selected at a fast enough rate, the colors can blend to produce yellow. Further, if the proportion of red to green is varied, orange and amber as well can be produced. If it were technically possible to produce a true chromatic blue-green LED, the red and blue-green could be modulated to produce a white light.

Perhaps most importantly, particularly where a large number of strings are used, the LED system described herein operates at less than 13% of the current and less than 0.5% to 0.7% of the power as an incandescent tree light. Due to the fusing of the transfer system the low power or current draw and isolation from the household power source the LED system is significantly more safe than the incandescent and other system available for ornamental tree lamps. Since the LED system described herein is practically shock resistant it is easier to store than the incandescent light system.

The present invention provides an improved decorative lighting means using LEDs, CMOS integrated circuits and high current MOS (metal oxide semiconductor) transistors. The invention provides for an extremely large configuration of LEDs to be driven at low average power and at the same time allow the user to select individual lights to be constantly illuminated or flash in response to an oscillating voltage source or allow multicolor patterns to be generated using bicolor LEDs.

The LEDs are connected by flexible current carrying wires attached to individual plugs and sockets that accommodate the LED and a series current limit resistor. Three such conductors are provided. One wire provides connection to the positive side of a constant voltage source the second to a "low-side" switch to ground of the same constant voltage source. The third wire allows connection to a secondary oscillator that derives power from a first or primary oscillator.

In the non-flashing mode of operation, the LED lamp is mechanically connected from the positive voltage wire to the "low-side" switch. The LEDs are electrically in parallel across these two wires. The length of the wires is limited only by the ohmic resistance of the wire and the size of the voltage source. For convenience, the number of lamps can be limited and connectors provided for plugging more of the same identical wiring configurations together maintaining a three wire parallel electrical connection. The immediate implementation of the invention allows for four such combinations to be driven from individual "low-side" switches connected to the primary power source and oscillator. The switching occurs at a frequency such that the human eye cannot detect the on/off condition of the diodes, 1250 Hz for this implementation. Each parallel configuration of LEDs is in the on-state for 200 microseconds and off for 600 microseconds. No two configurations are on at the same time. The connection to ground through the low-side switch is alternately applied to one of the four configurations, each configuration being turned on for 200 microseconds once each 800 microseconds.

The main oscillator allows this basic frequency to be varied to the upper limit of the LED response and to a lower limit which is detectable to the human eye.

The secondary CMOS oscillator derives power from the primary oscillator via the positive voltage rail and the intermittent switching of the low-side switch to ground. This switching action causes a capacitor storage element to charge, through an isolation diode, toward the voltage of the positive supply rail. The diode prevents the capacitor from discharging through other parts of the system and therefore can only discharge into the secondary timing circuit. The second oscillator frequency is set for an on/off cycle of five seconds. This period can also be varied. The output of the oscillator drives a "high-side" power MOS transistor switch that applies the second timing pulse to the third wire. The lights are mechanically rotated in their socket so as to break the connection with the first, positive voltage rail, maintain contact with the low-side ground switch and connect with the third secondary oscillator high-side switch. The present implementation allows the high-side switch to be connected to the positive voltage rail for three seconds and disconnects the LEDS from this source for two seconds. In this way, individual lamps connected to the secondary oscillator can be illuminated constantly by connection to the positive voltage rail and the low-side switch or can be made to flash by physically rotating them to permit connection to the output of the high-side switch and the low-side switch. These combinations can be extended until the switching frequency of the main oscillator reaches a rate that can be detected by the human eye, approximately 100 Hz. If the on-time of the individual configurations of LEDs is maintained at 200 microseconds, 50 (fifty) such configurations could be driven. The present implementation has 38 LEDs in parallel per light string with two light strings per configuration connected via a plug/socket. This two string configuration is driven by a MOS power low-side switch. This means each switch is driving 76 LEDs at a peak current per LED of 25 milliamps or a total of 1.9 amperes peak. The voltage source is 6.5 volts, sufficient for driving at least 2 (two) configurations. This represents $6.5\times1.9=12.35$ watts peak. Since each configuration is on for only 200 microseconds out of 800 microseconds, this represents a duty cycle of 25% and the average power is $12.35\times0.25$ or 3.08 watts. This method of illumination, especially when applied to ornamental and seasonal decoration, is extremely safe compared to conventional methods.

BRIEF DESCRIPTION OF THE DRAWINGS

FIG. 3 shows a configuration of LEDs with associated series current limit resistors connected between the positive voltage rail and the low-side switch ground wire.

FIG. 4 is the secondary oscillator.

DETAILED DESCRIPTION OF THE REFERENCED EMBODIMENT

Figure 2:
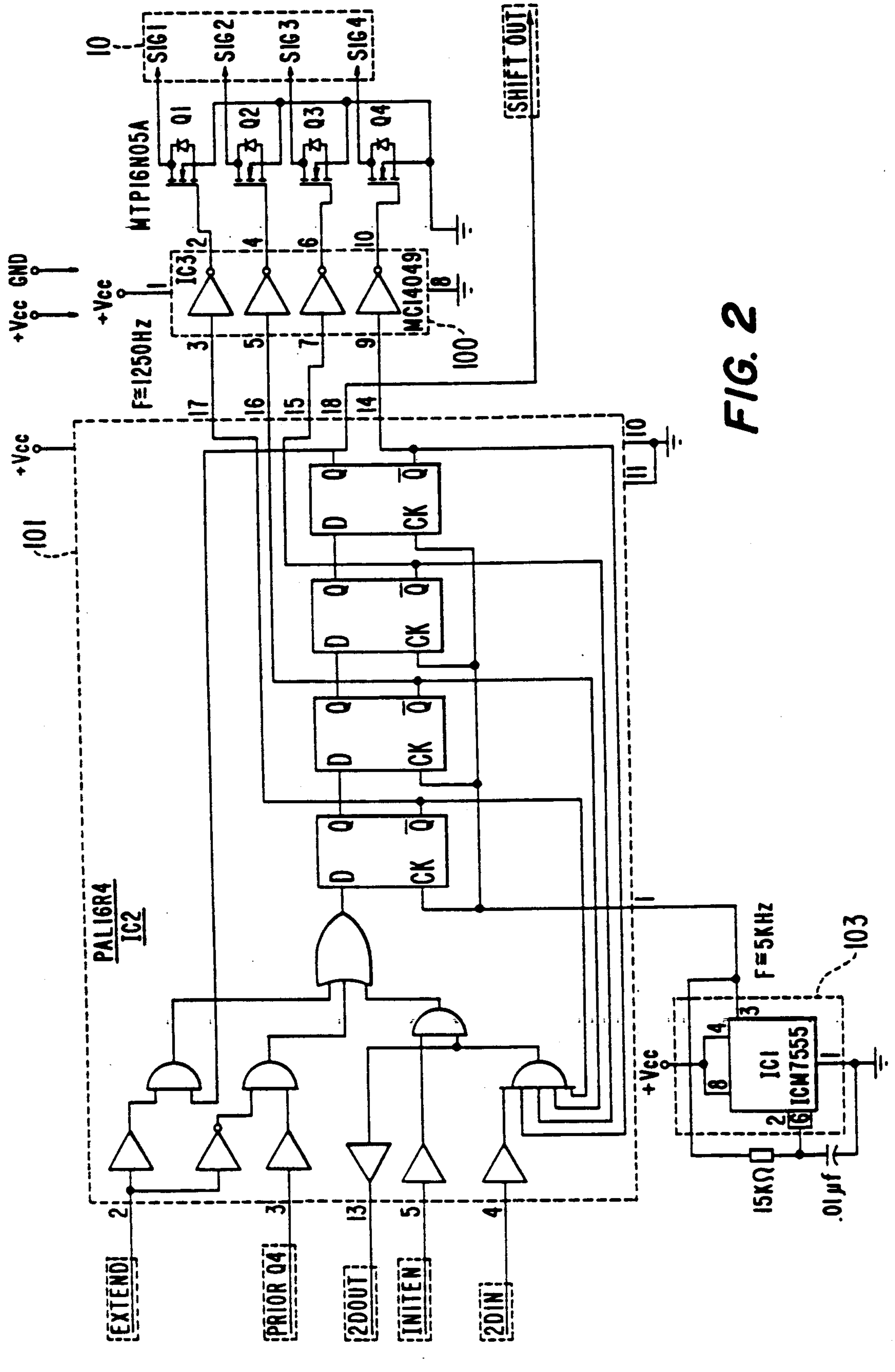
FIG. 2 is a schematic of the main oscillator.

Referring now to the drawings, specifically FIG. 2, IC1 denotes a CMOS timer configured to function as an astable multivibrator with a 50% duty cycle. The duty cycle is not critical to this application but serves to reduce the discrete component count if set at 50%. Since this timer is well known in the art, a detailed description of its structure is not deemed necessary.

A plurality of 38 LEDs 9 are arranged in a parallel configuration as denoted by numerals 1 through 38 in FIG. 3. All cathodes of the LEDs are connected in common to the low-side switch line, 11. Each LED anode is in series with a current limit resistor, 12. All resistors are connected in common to the positive voltage rail, +Vcc through conductor 13. The low-side switch conductor, 11 is driven by the drain of a MOS power transistor, one of the Q1 through Q4, 10, 10', 10" or 10''' as shown in FIG. 2.

The gates of Q1 through Q4 control the conduction of the MOS transistors. When the gate voltage is of sufficient magnitude, the transistor will turn-on and conduct into saturation effectively applying a ground to conductor 11. These devices are well known in the art and a detailed description of their structure is not deemed necessary. This action will cause all diodes in a particular light string or plurality of light strings to conduct and illuminate. The intensity of the LED is controlled by the current limit resistor 12 and the duty cycle and pulse width with which the ground is applied through the MOS transistor to conductor 11. The power used is a function of the current limit resistor, size of the power source and the duty cycle and pulse width with which the ground is applied through the MOS transistor to conductor 11.

Figure 6:
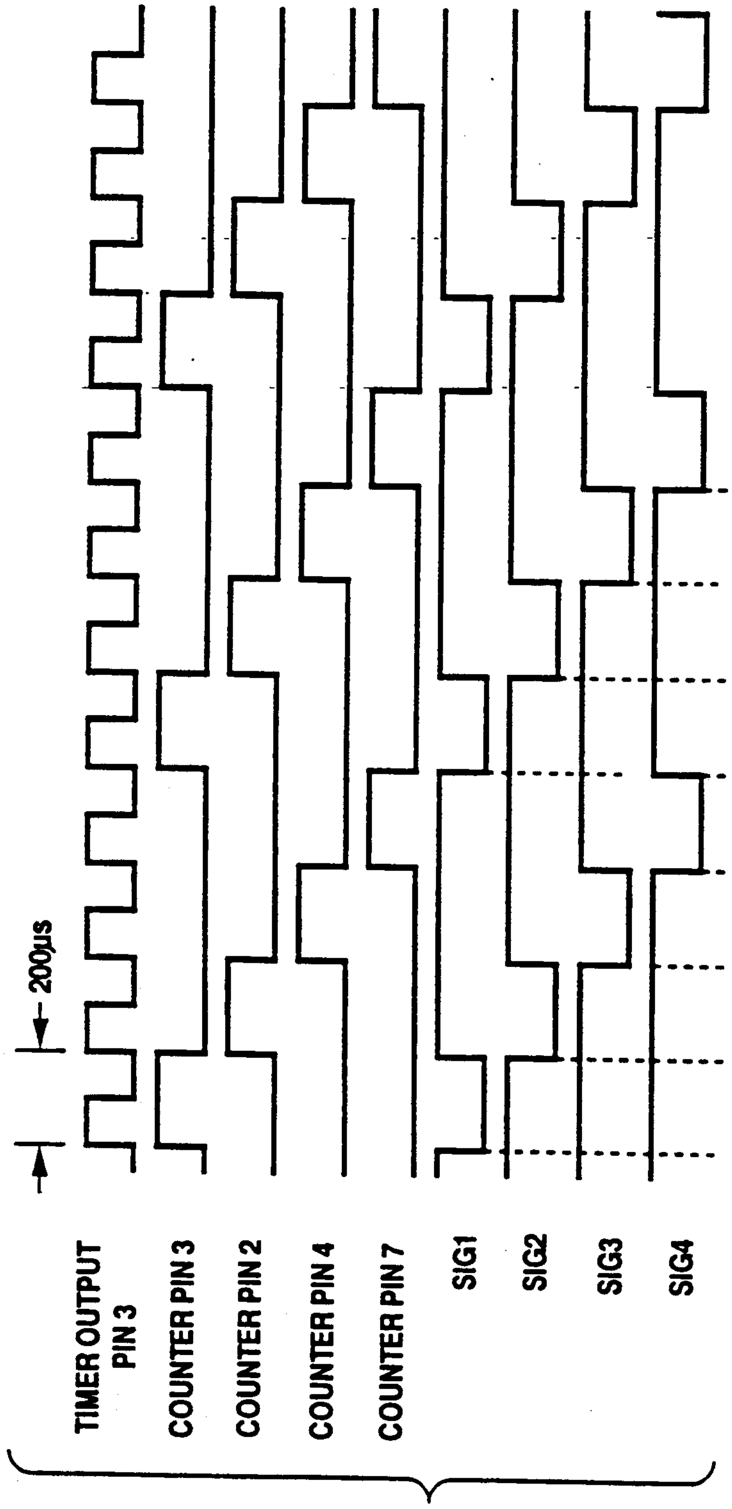
FIG. 6 is the waveforms associated with the main oscillator.

In FIG. 2, IC3 100 buffers the MOS transistors from the outputs of a CMOS Programmable Array Logic (PAL) integrated circuit, IC2 101, configured as an expandable shift register. The PAL is user programmable and is intended to integrate several random logic functions into one integrated circuit package. Each of the outputs, pins 17, 16, 15 and 14 of the PAL shift register 101 has its own buffer/driver. Again, these devices are well known in the art and a detailed description of their structure and operation is not deemed necessary. Only one gate of the MOS transistors is driven at a time in response to its respective output from the shift register, IC1 101. Therefore, only one string of LEDs or plurality of strings will be illuminated at any point in time. These responses are shown graphically in FIG. 6 as the SIG1 through SIG4 waveforms. The shift register, IC2 101 is shifting a single logic one bit in response to he timer IC1 103. This timer has a frequency such that the light strings are illuminated at a rate as to be undetectable to the human eye, generally greater than sixty (60) illuminations per second. In its present embodiment, the timer is set to run at a frequency of 5 KHz. The shift register, IC2 101, is automatically set to an all zero condition upon power application. This insures that the register will start shifting in the correct sequence and that no strings of lights will be illuminated prior to the start of normal sequencing of the shift register. The ZDIN (zero detect input) signal, pin 4, along with the complement register outputs are AND gated to set an initial logic 1 at the data input to the first flip-flop of the register. If IC2 is the first or only shift register in a series of registers, the INITEN (initialize enable), pin 5, is permanently tied to +Vcc with all successive shift register INITEN pins tied to ground. This is used to prevent other stages from shifting a logic 1 into the first flip-flop after power-on. The ZDOUT (zero detect out), pin 13, also detects a zero condition and passes this information back to the preceding shift register stages. Shifting of the initial logic 1 applied to the first flip-flop within or between successive shift registers is accomplished with the EXTEND (pin 2), PRIOR Q4 (pin 3) and SHIFT OUT (pin 18) signals. If the EXTEND input is tied to +Vcc, the SHIFT OUT signal will be internally recirculated to the data input of the first flip-flop. This is the case where there are no succeeding shift registers, i.e. IC2 is the only shift register in the circuit. If the EXTEND input is tied to ground, this implies more than one shift register is present and the SHIFT OUT of the last shift register will be recirculated to the PRIOR Q4 input of IC2. Successive shift registers will have their own respective buffer/-drivers, IC3 and MOS transistors, Q1 through Q4. If the shift register IC2 101 is configured to recirculate the initial logic 1 to the first flip-flop, pin 18 is internally gated to the Data input of the first flip-flop (no successive shift register stages) it will take four (4) clock cycles to accomplish this recirculation, one (1) clock cycle for each flip-flop. Therefore, each flip-flop output has a frequency of 1250 Hz (period of 800 microseconds) and is on only 25% (200 microseconds) of a total cycle.

With the foregoing arrangement, it is evident that the LEDs will be illuminated in groups in an orderly fashion so as to minimize the power requirement of the system. This is a desirable requirement for ornamental and seasonal decorations where safety is a concern and a large number of lights is to be illuminated. The system can be further expanded by the inclusion of more shift register stages from IC2 and the addition of their respective MOS low-side switches and connective conductors. The configuration is not limited to LEDs but can also be used to operate lamps having a greater power requirements. Further, the present embodiment allows the LED power controller consisting of IC1, IC2, IC3 and the devices Q1 through Q4 plus associated discrete components to be fabricated into a single integrated circuit package presently described in the industry as a "SMART POWER" integrated circuit.

Figure 5:
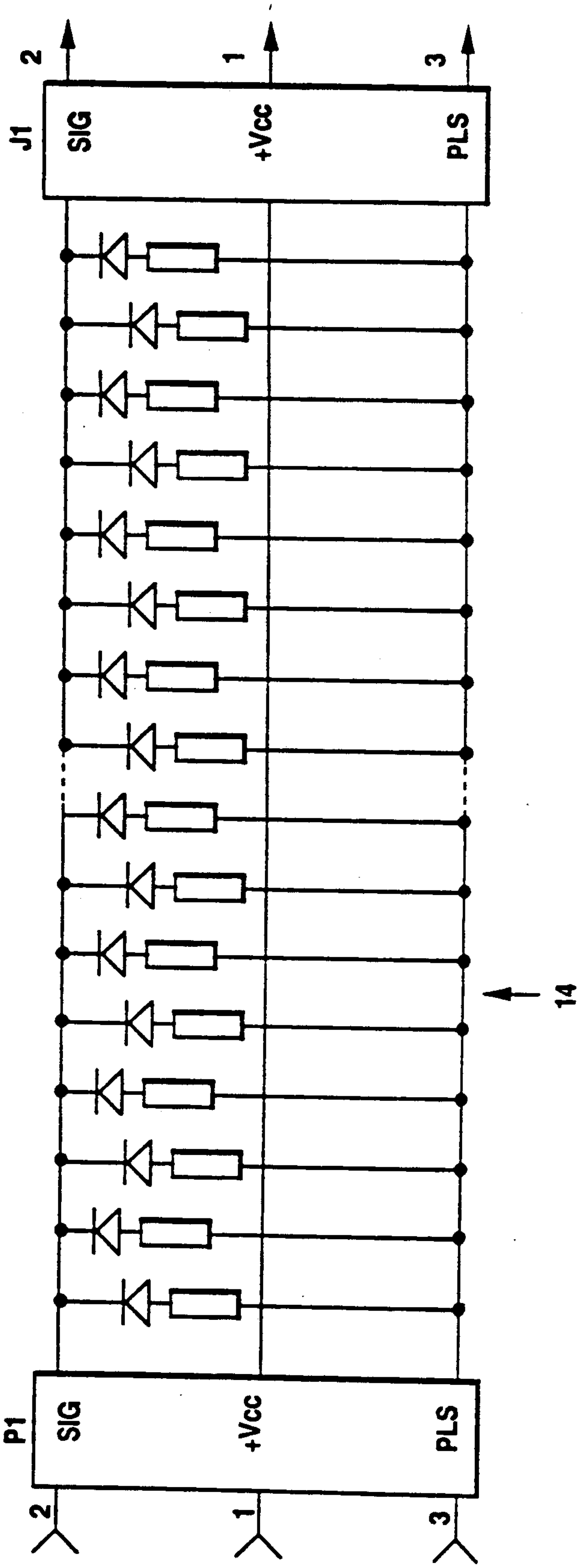
FIG. 5 shows the same diodes of FIG. 4 electrically connected and being driven from the low-side switch wire and the high-side switch wire from the secondary oscillator.
Figure 7:
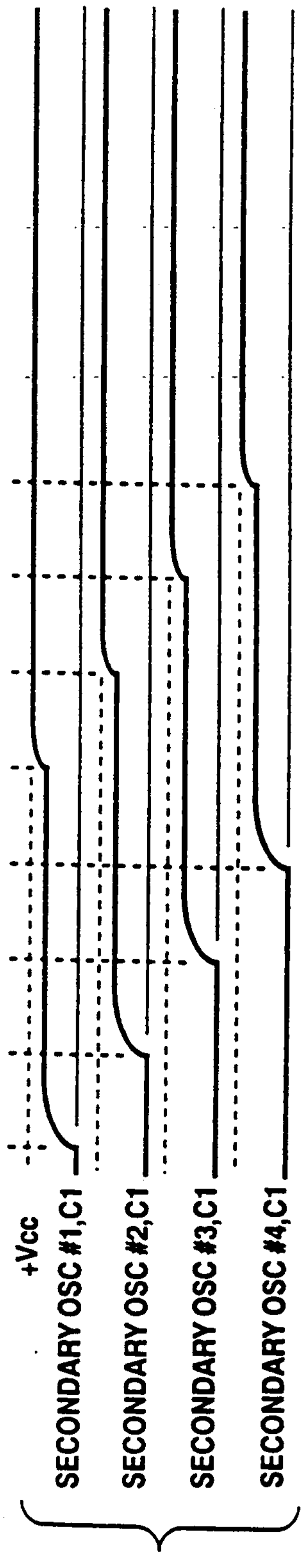
FIG. 7 shows the secondary oscillator charge/discharge waveforms.

In its present embodiment, the system has been optimized to allow for a large number of lamps, minimal power consumption and number of conductors to the lamps. The use of three conductors allows for further control of the individual LEDs within a string or plurality of strings. FIG. 4 describes a secondary timer which, in conjunction with the ability to physically connect the lamps between either the low-side conductor and the positive power rail or the low-side conductor and the high-side switch allows the individual lamps to be either illuminated as described above or to be turned on and off at a second frequency. In its present embodiment, this secondary timer 104 will allow illumination of the LEDs for three (3) seconds and turn them off for two (2) seconds. The secondary timer, IC4 104 in FIG. 4 is configured to produce a 0.2 Hz (2/10 Hz) waveform with a 60% duty cycle. The output of IC4 104 pin 3, drives a high-side switch that is connected to the positive voltage rail, +Vcc. The output of the high-side switch provides a signal on the PLS conductor 105. The LEDs can now be individually rotated as shown schematically in FIG. 5 and FIG. 8 to allow the LEd to derive power from the positive voltage conductor under control of the low-side and the high-side switch. During the time that the LEDs are connected to the positive voltage conductor through the high-side switch, they will function as described previously, illuminating at a 1250 Hz rate. When the high-side switch is off, the LEDs are disconnected from the positive voltage conductor and are not illuminated. Capacitor C1 charges in response to the low-side conductor switching on and off. During the on-time of the low-side switch, C1 will charge toward the value of the positive voltage rail. During the off-time of the low-side switch, C1 is prevented from discharging back into the power supply by diode D1. Therefore, C1 will provide power only to IC4, a CMOS device whose power requirement is extremely small. This secondary timer derives its power from the voltage supplied in the positive voltage conductor which is switched on and off by the low-side switch. The charge/discharge cycles of C1 are approximated in FIG. 7. Further, the present embodiment allows the secondary power controller consisting of IC4 and the device Q5 105 plus associated discrete components excepting C1 to be fabricated into a single integrated circuit package presently described in the industry as a "SMART POWER" integrated circuit.

Figure 8:
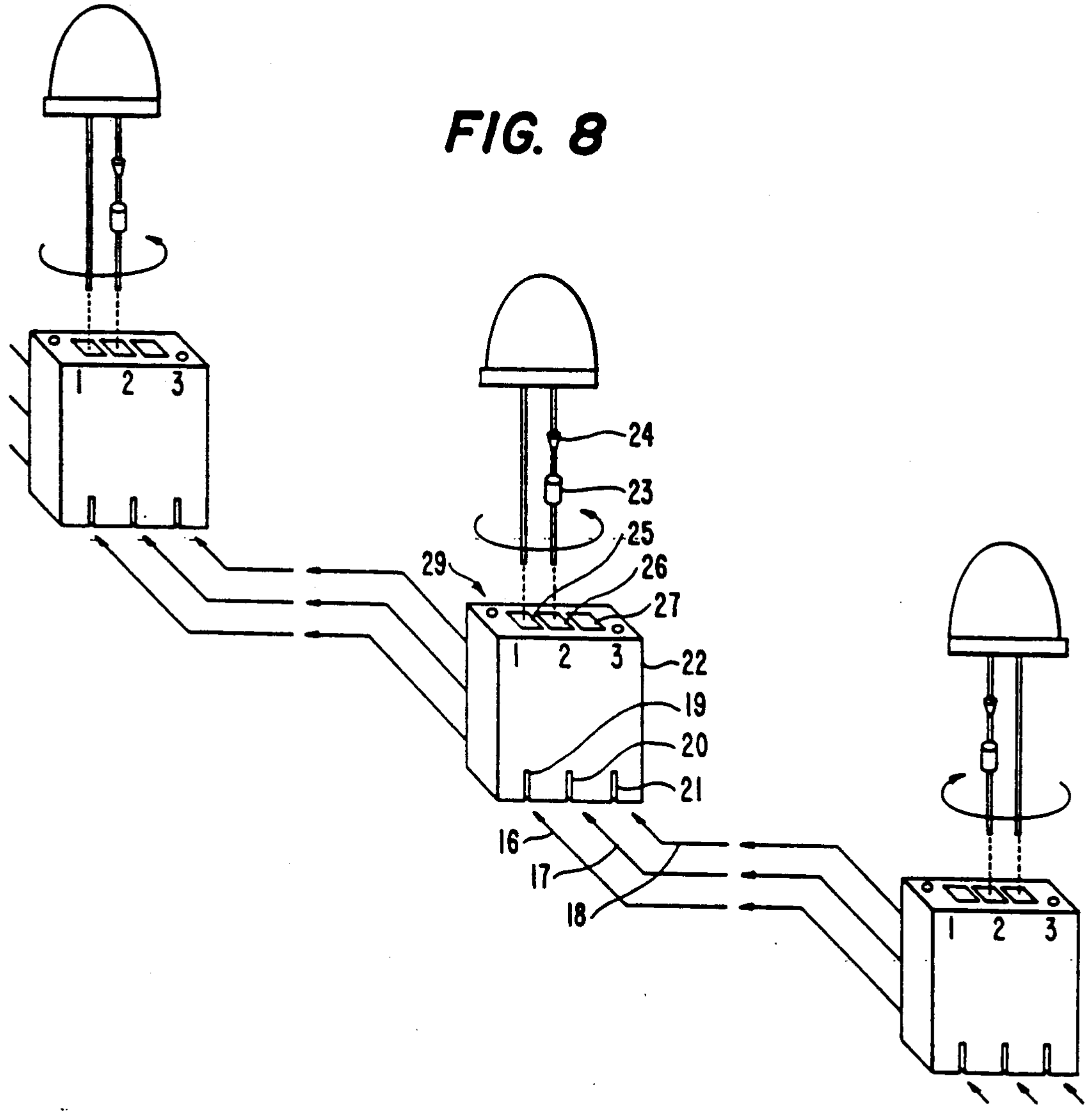
FIG. 8 shows an exploded view for socketing of the LEDs.

FIG. 8 shows the connection of the lamp sockets to the three power conductors. In its present embodiment, the three conductors 16, 17 and 18 are forced into insulation displacing contacts 19, 20 and 21 which are retained in enclosure-socket 22. The series resistor, 23 is joined to the anode of the LED by a crimp or solder joint 24. The series resistor 12 can be incorporated directly in the contact enclosure or alternately combined inside of the LED itself. The LED or LED/resistor combination is inserted into the enclosure-socket through holes 25 and 26 and 27, depending on desired mode of operation, constant illumination or pulsing as described previously. In this way, contact is made between the LED/resistor combination and the insulation displacement contact housed in the socket enclosure.

The use of a Bicolor LED for producing color mixing requires that power to the device be supplied as either an alternate positive and negative signal for two lead devices or signals that alternately select one of the two or more colors within the LED. The proper method to accomplish the mixing of colors in a Bicolor LED is with Pulse Width Modulation (PWM) of the signals driving the devices. PWM is used to control the length of time each device is selected and thereby the color produced by the device.

Figure 9:
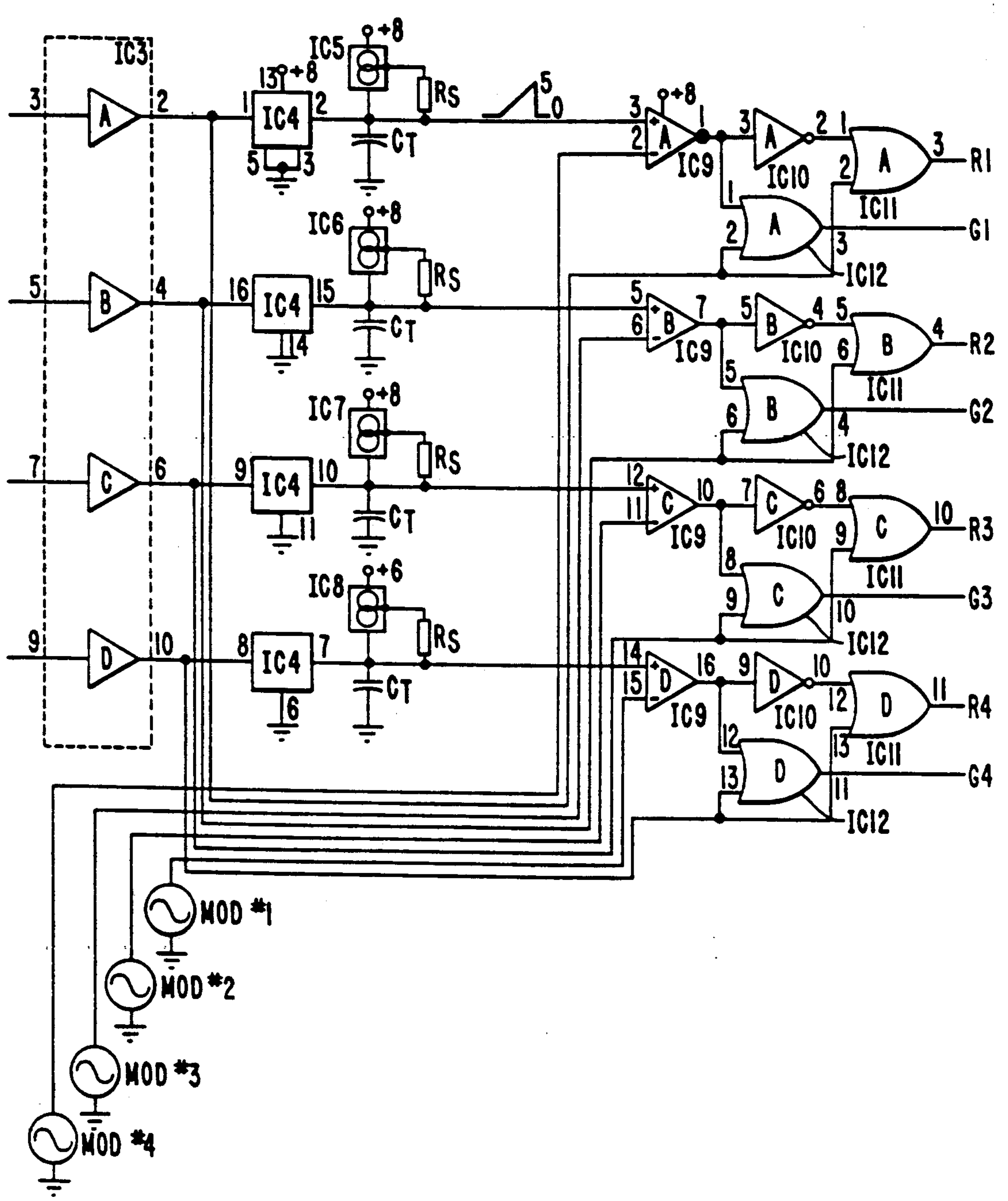
FIG. 9 shows pulse width modulating circuitry.
Figure 10:
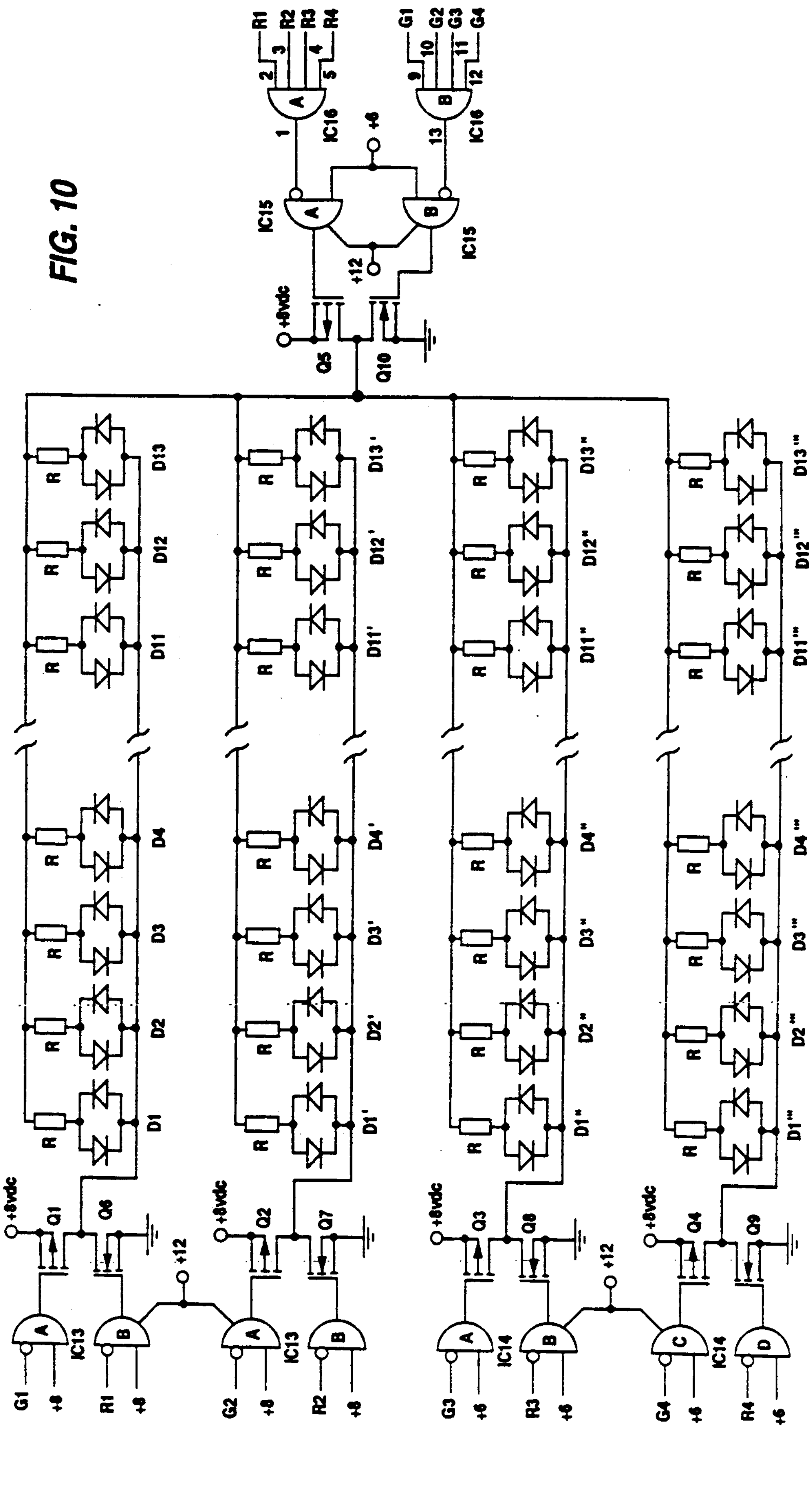
FIG. 10 shows H-switch light string power drivers.
Figure 11:
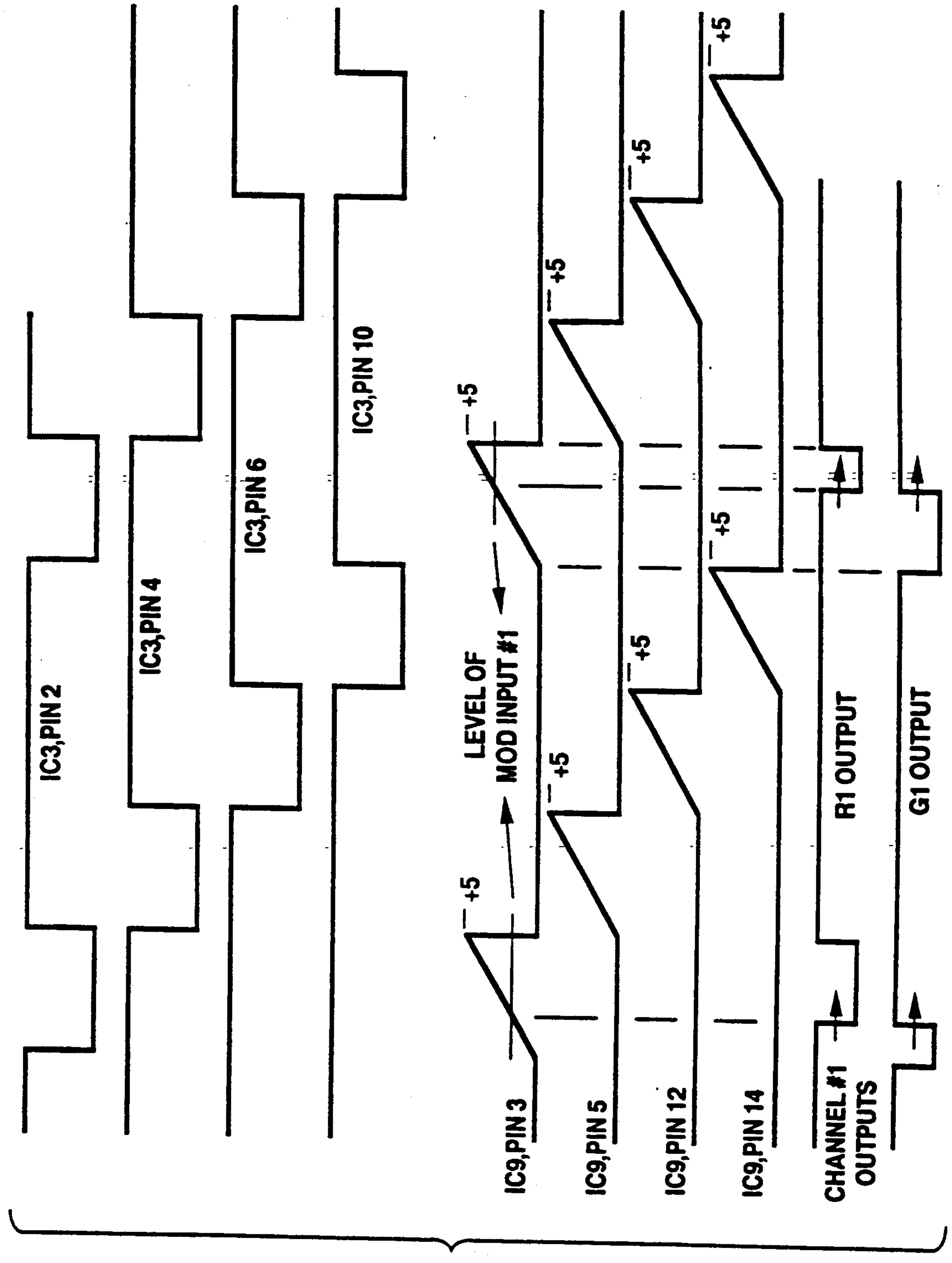
FIG. 11 shows pulse width modulation waveforms.
Figure 12:
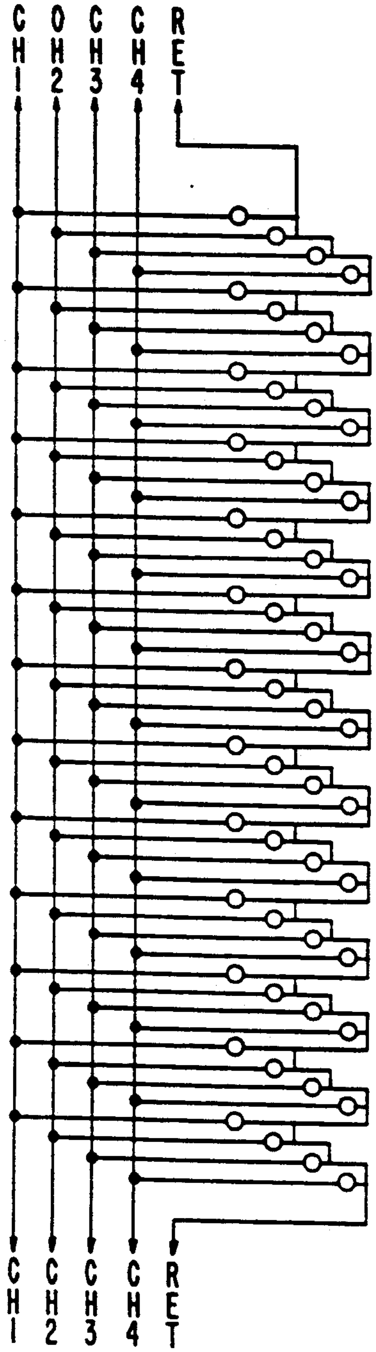
FIG. 12 shows four channel light string cable harness.
Figure 13:
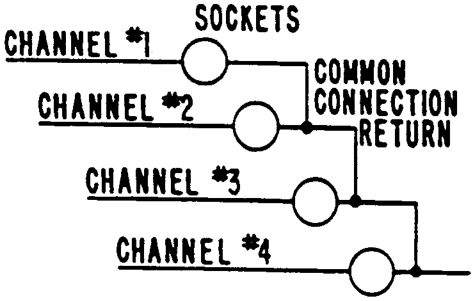
FIG. 13 shows socket connection detail.

FIGS. 9 and 10 depict a means to produce such control using the light string and controller configuration previously described. FIG. 11 describes the waveforms produced by the additional components. FIG. 12 and 13 show the construction of the light strings, a modified version of FIG. 1 and 3. The light strings are multiplexed at a 1 KHz rate as before. IC3 in FIG. 2 is shown replaced by a noninverting MC14050 in FIG. 9. The negative gate from IC3, Pin 2 is used to start a positive going +5 volt ramp into IC9, Pin 3. IC3, Pin 2 going negative turns CMOS switch IC4, Pin 2 off allowing the timing capacitor $C_T$ to charge through constant current source IC5. At the end of the 250 s gate from IC3, Pin 2, the timing capacitor will be shorted and discharged by IC4 and the ramp will terminate abruptly. IC9 is a quad comparator that has two signals present on one of its four comparator inputs. The positive input at Pin 3 is the ramp just described. The negative input at Pin 2 is a DC level or a modulating input from another signal source such as a waveform generator, random noise source or sound source. If the positive ramp input is less than the negative modulating input, the output of IC9, Pin 1 will be low or ground. If the ramp input is more positive than the modulating negative input, IC9, Pin 1 output will be high. The maximum excursions of the modulating inputs are limited to the positive and negative amplitudes of the ramp voltage. With no signal applied, the input from the modulating source will have a DC baseline of 2.5 volts. The ramp input and the modulating source input will then be equal halfway through the cycle of the ramp (if the modulating source #1 is baseline only). The output of IC9 will be low during this time. When the ramp voltage crosses the halfway point, the positive input of the comparator will be greater than the negative input and the output of the comparator will go high (positive).

The output of IC9, Pin 1 is inverted by IC10. The inverted output of IC10, Pin 2 is ORed with the original multiplexing signal from IC3, Pin 2. The signal from IC3, Pin 2 enables IC11 and allows the inverted output of IC10, Pin 2 to be propagated only during the time period defined by IC3, Pin 2 or 250 μs. IC12 is likewise enabled by IC3 only during the same time period.

If the output of the comparator is negative 50% of the cycle.

The R1 output is taken to FIG. 10 along with the other R outputs. During that portion of the cycle that R1 is low, IC16 output will go low. IC15 is configured as an inverter and will drive Q5 into saturation. Q5 will apply a positive voltage to the corresponding diodes in that string. IC13B will likewise drive Q6 into saturation. Q14 supplies the ground return for the light string. If the lamps are inserted in the proper direction, all the red diodes in that string will be illuminated. When the output of the comparator IC9 goes positive during the remaining 50% of the cycle, the R1 output will go high and the G1 output will go low. This will cause Q5 to turn off and Q10 to conduct applying a ground to the opposite end of the light string. A G1 low signal will cause Q1 to saturate supplying a positive voltage for the selected light string. If the lamps are inserted in the proper direction, all the green diodes in that string will be illuminated. Since the red and green were illuminated for 50% of the time each, the color produced will be approximately yellow depending on the chromatic quality and balance of the red and green LEDs being used.

As the modulating source varies in amplitude it will cause the ratio of conduction of the red and green LEDs to vary accordingly. The frequency of the modulating signals must be quite slow relative to the multiplexing of the light strings so the human eye can detect the color changes produced. Waveforms ranging from D.C. to 30 Hz are used in the present embodiment of the invention.

Figure 1:
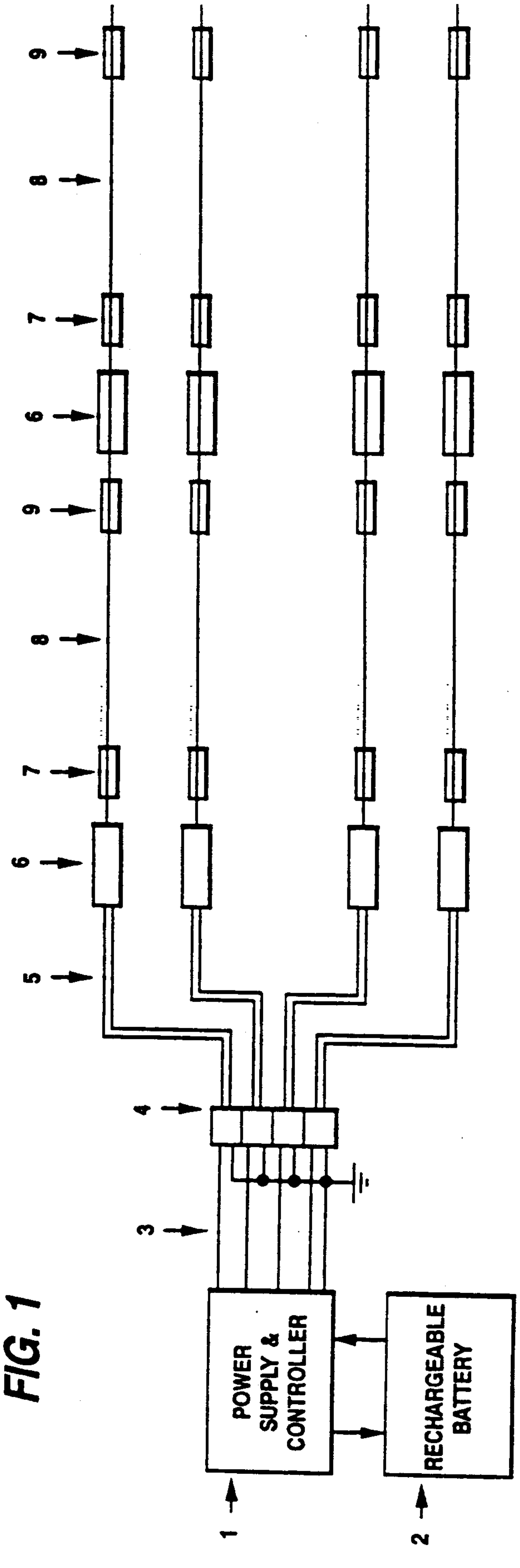
FIG. 1 is a block diagram of the present system showing power source and four LED configurations.

To maintain a pleasing ornamental display, low power consumption and expandability, the topological configuration for the light strings previously shown in FIG. 1 has been detailed in FIG. 12 and FIG. 13. FIG. 13 depicts one such light string. Each string is comprised of a plurality of individual conductors, five in the present embodiment. Conductors CH1 or CH2 or CH3 or CH4, when individually powered from the controller/multiplexer, form a complete circuit with the RET conductor. Both the CH conductors or the RET conductor can supply power and the other be the ground return line depending on which color diode, red or green, is selected by the controller. Only one of the CH conductors will be under power at any point in time.

Each CH conductor is connected to one contact of a plurality of sockets, thirteen (13) in the present embodiment. The other contact of each socket is connected to the RET conductor. Another, third wire, to implement the flashing function described in FIG. 8, could be added to the configuration of FIG. 12 but was not for the sake of simplicity. The four CH conductors together have fifty-two (52) sockets (13×4 in the present embodiment) wherein each socket is connected to the RET conductor. Since each of the CH conductors is operated in a multiplexed manner as previously described, at any point in time, only thirteen (13) LEDs are in conduction. If the peak current drawn by each LED is 50 milliamps, the total peak current drawn is $13\times50$ milliamps$=0.65$ amps at any point in time. Each of the four CH conductors and thus thirteen LEDs on that conductor is on for only 25% of the total cycle and the average current is therefore, $0.25\times0.65$ amps$=0.162$ amps. After high and low-side switch losses, the total voltage across the LEDs is approximately 7.8 volts. Therefore, the peak and average power at any point in time is 5.07 watts and 1.27 watts, respectively, per light string.

The light sockets are spaced on each CH conductor such that if the four CH conductors are twisted together, the sockets would be equidistant from each other and repeat in groups of four, that is, the LEDs will repeat the sequence "CH1, CH2, CH3, CH4, CH1, CH2, CH3, CH4", etc., etc. A plug is provided at one end of the light string and a socket at the other for further concatenation of light strings.

Figure 14:
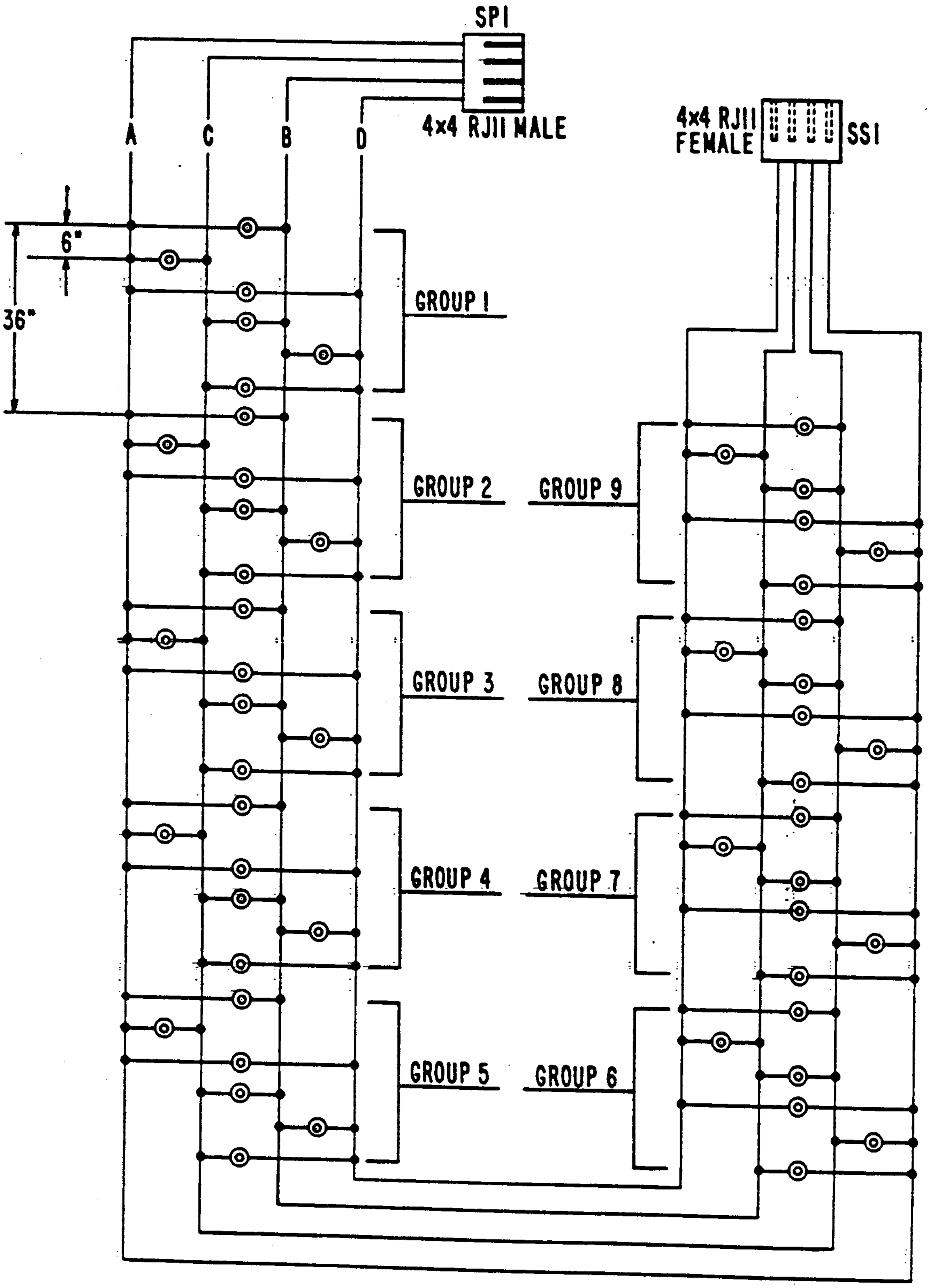
FIG. 14 is a schematic of a four wire configuration with nine groups of lights.
Figure 15:
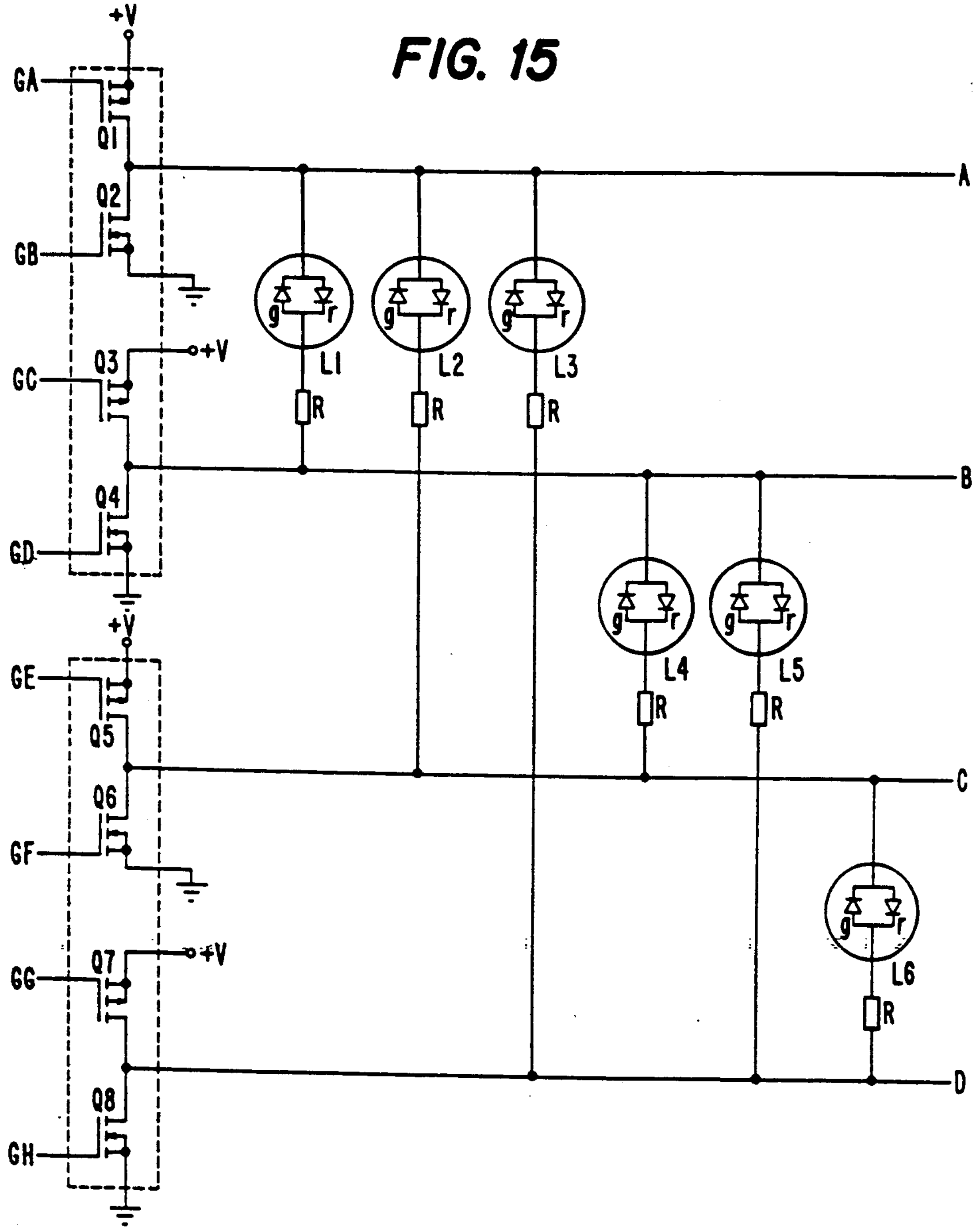
FIG. 15 is a detail schematic of one of the groups of FIG. 14.

FIGS. 14 and 15 represent a minimal power, four wire configuration with all lights in parallel across the power rails. The lights are driven in groups of six now instead of four as with the five wire configuration. The four wire configuration in conjunction with the H-Bridge power drivers in FIG. 15 eliminates the fifth common wire and the requirement for a second negative power supply. In the H-Bridge, only two devices are conducting at a time, one top transistor tied to +V and one transistor tied to ground. For instance, to turn on the red LED in L1, transistor Q1 is turned on by applying a "0" to its gate, GA, and transistor Q4 is turned on by applying a "1" to its gate, GD. Q1 supplies the +V to the anode of L1, the red LED, and transistor Q4 supplies the ground to the cathode of L1 red LED. To turn the green LED on in L1, the +V and ground are reversed across the light by Q2 supplying the ground and Q3 supplying the +V. This particular configuration requires six distinct time periods to completely scan all lamps instead of four. This is because the minimal power configuration automatically groups the lights by six. To preserve the typical fifty light string, this requires that the strings have nine groups of six lamps or fifty-four total.

The same lamp from each group will be illuminated during each of the six time periods. Since there are nine groups, there will be nine lamps on during each time period. If each lamp requires 50 milliamps, the peak current drawn is $9\times0.050=450$ milliamps. Since the lights are on for 1/6 of the time, the average current is 450 ma/6=75 ma. The peak and average powers are 2.25 watts continuous and 375 milliwatts, respectively, for a five (5) volt only system.

The above has been a detailed description of the preferred embodiment of the invention. The claims which follow define more freely the scope of invention to which applicant is entitled. Modifications or improvements which may not come within the explicit language of the claims described in the preferred embodiments should be treated as within the scope of invention insofar as they are equivalent or otherwise consistent with the contribution over the prior art and such contribution is not to be limited to specific embodiments disclosed herein.

I claim:

1. A light display comprising:

electrically conductive primary source connector, a ground connector and a secondary source connector constituting a first electrically conducting string, a number of LEDs, means for connecting the LEDs in parallel across the ground connector and one of the primary and secondary source connectors; and at least one of said LEDs including a set of bicolor diodes and means for controlling the color of said set by oscillating the current between portions of the diodes at preselected rates; and said means for controlling the color including oscillating current between portions of said bicolor diodes at such a rate to produce a color different than that of either color of said bicolor diodes.

2. The display according to claim 1 further comprising an electronic switching mechanism alternating between on and off positions to connect and disconnect LEDs and energize said LEDs at a rate imperceptible to the human eye.

3. The display according to claim 2 wherein the said electronic switching mechanism oscillates between on and off positions at a rate of 1,250 HZ.

4. The light display according to claim 2 and a second electrically conducting string comprising a second primary source connector, a second secondary source connector and a second ground connector wherein said electronic switching mechanism oscillating between an on and off position for each of said ground connectors alternates between each string so that the first and second string are not on at the same time.

5. The light display according to claim 1 wherein said secondary source connector is connected to a pulsing mechanism, for pulsing the LEDs at a rate visible to the human eye.

6. The light display according to claim 5 wherein the said pulse mechanism has a pulse frequency of 0.2 HZ.

7. The light display according to claim 6 wherein said strings are flexible current carrying wires and said ground connector being coupled to a low side conductor of said wires, and said primary and secondary sources being coupled to a positive side conductor of said wires.

8. The light display according to claim 7 wherein said electronic switch mechanism includes a transistor having a gate to connect the low side to ground when in the "on" position and disconnecting the low side to ground when in the "off" position.

9. The light display according to claim 8 wherein said transistor is driven by an oscillator.

10. The display according to claim 9 wherein said oscillator drives each transistor between an open and closed position at a frequency of 1,250 HZ.

11. The light display according to claim 10 comprising four strings with each string having a ground connector, a primary source connector and a secondary source connector, said oscillator oscillating between each one of said four strings in a regular fashion so that only one string is "on" at any time.

12. The light display according to claim 11 further comprising four transistors where each transistor is oscillated at a rate of 1,250 HZ between an open and closed position in a regular fashion so that only one string is on at a time.

13. The light display according to claim 5 wherein said pulsing mechanism is connected to said secondary connector and is connected to a common source for said primary connector.

14. The light display according to claim 13 wherein said pulsing mechanism includes a second timer connected to an oscillator of said common source to produce pulsing signals at a rate visible to the human eye.

15. The light display according to claim 14 wherein said secondary timer produces a regular signal oscillating between on and off position to produce said visibly perceptible flashing light signal for the LED.

16. The light display according to claim 15 wherein said frequency of said secondary timer is 0.2 HZ.

17. The light display according to claim 15 wherein said means for connecting the LEDs in parallel between the primary source and ground connectors and the secondary source and ground connectors includes a member for electrical connection to each of said connectors and having means for connecting LEDS in parallel between the ground connector and any of the source connectors.

18. The light display according to claim 17 wherein said member for connecting said LEDs including a socket for electrical connection to said ground connector, said primary source connector and said secondary source connector, said LED having first and second connectors cooperating with said socket for mechanical engagement of said first and second connectors with said ground connector and said primary source connector or said ground connector and said secondary source connector.

19. The display according to claim 18, wherein said socket includes a ground socket, a primary socket, and a secondary socket, an electrical connection with the corresponding ground connector, primary source connector and secondary source connector, said LED having two connections to fit in any two of said ground and primary and secondary source connectors.

20. A light display comprising:

electrically conductive primary source connector, a ground connector and a secondary source connector constituting a first electrically conducting string, a number of LEDs, means for connecting the LEDs in parallel across the ground connector and one of the primary and secondary source connectors;

said means for connecting the LEDs in parallel between the primary source and ground connectors and the secondary source and ground connectors includes a member for electrical connection to each of said connectors and having means for connecting LEDs in parallel between the ground connectors and any of the source connectors.

21. The light display according to claim 17 wherein said member for connecting the LEDs includes three space connectors, said LED having first and second complementary connectors cooperating with said spaced connectors for mechanical engagement of said first and second connectors with said ground connector and said primary source connector or ground connector and said secondary source connector.

22. The display according to claim 21, wherein said member is a socket member having a ground socket, a primary socket, and a secondary socket, each having an electrical connection with the corresponding ground connector, primary source connector and secondary source connector, said LED having said two complementary connectors configured to fit in any two of said ground and primary source connectors and said ground and secondary source connectors.

23. The display according to claim 22, wherein said electrical connection of said socket member includes insulation piercing contacts to expose within each said socket, said ground connector, said primary source connector, said secondary source connector.

24. A light display comprising:

electrically conductive primary source connector, a ground connector and a secondary source connector constituting a first electrically conducting string, a number of LEDs, means for connecting the LEDs in parallel across the ground connector and one of the primary and secondary source connectors wherein at least one of said connectors includes an electronic switching mechanism alternating between on and off positions to connect and disconnect LEDs and energize said LEDs at a predetermined rate;

means for connecting a second electrically conducting string comprising a second primary source connector, a second secondary source connector and a second ground connector wherein said electronic switching mechanism includes means for oscillating between an on and off position for each of said ground connectors alternating between each string so that the first and second string are not on at the same time;

said switching mechanism connected to said connectors and having a selection means for selecting a pulse rate for pulsing the LEDs at a rate visible to the human eye; and means for connecting said LEDs including a member for electrical connection to said ground connector, said primary source connector and said secondary source connector, said LED having first and second connectors cooperating with said member for mechanical engagement of said first and second connectors with said ground connector and any of said primary source connector and said secondary source connector.

25. The display according to claim 24, wherein said member is a socket member including a ground socket, a primary socket, and a secondary socket, for electrical connection with the corresponding ground connector, primary source connector and secondary source connector, said LED having two connections to fit in any two of said ground and primary source connectors and said ground and said secondary source connectors.

26. The display according to claim 25 wherein said switching mechanism is programmable.

27. A method for producing a yellow light with LED comprising:

(a) fabricating a bicolor LED in red and green;

(b) alternately energizing the bicolors at a sufficient rate to produce the color yellow to the human eye.

28. The method according to claim 27 further comprising controlling the proportion of energizing between red and green to produce other colors including orange and amber.

29. An apparatus for producing varying colors of light comprising:

(a) an LED of at least a bicolor configuration in red and green; and (b) means for alternately energizing said red LED and said green LED to produce a color other than red and green.

30. The apparatus according to claim 29 wherein the means for alternately energizing said red LED and said green LED includes alternately energizing at a rate to produce the color yellow.

31. The apparatus according to claim 30 wherein said means for alternately energizing said LEDs including means for generating a signal for driving the LEDs and modulating the pulse width of said signal.

32. The apparatus according to claim 31 wherein said means for alternately energizing said LEDs includes:

(a) a comparator;

(b) a first signal source for charging the comparator with a first input signal at a constant rate of change for preselected time period;

(c) a second signal source providing a second input signal;

(d) said comparator also connected to said second signal source;

(e) said comparator generating an output signal as a function of said signals from said first and second signal sources;

(f) said output being connected through control means to control the timing of the delivery of signals to said LEDs; and (g) means for controlling the amplitude of said second signal source to control the ratio of conduction to said LEDs.

* * * * *